United States Patent [19]

Bukrinsky et al.

[11] 4,362,693

[45] Dec. 7, 1982

[54] SYSTEM FOR MITIGATING CONSEQUENCES OF LOSS OF COOLANT ACCIDENT AT NUCLEAR POWER STATION

[76] Inventors: Anatoly M. Bukrinsky, prospekt Vernadskogo, 119, kv. 19; Julian V. Rzheznikov, Michurinsky prospekt, 16, kv. 35; Jury V. Shvyryaev, Dnepropetrovskaya ulitsa, 23, korpus 3, kv. 117; Viktor P. Tatarnikov, ulitsa Chusovskaya, 11, korpus 8, kv. 24; Alexandr L. Lapshin, Yasenevo, Mikroraion 17, korpus 161-B, kv. 121, all of Moscow; Vladimir I. Sanovich, Bolshaya Porokhovskaya, 45, kv. 64; David A. Zlatin, Zanevsky prospekt, 43, kv. 132, both of Leningrad; Jury A. Kuznetsov, Tverskaya ulitsa, 25/15, kv. 25, Gorky; Evgeny A. Babenko, Inzhenernaya ulitsa, 32, kv. 12, Sverdlovsk, all of U.S.S.R.

[21] Appl. No.: 81,526

[22] Filed: Oct. 3, 1979

[51] Int. Cl.³ .............................................. G21C 9/00
[52] U.S. Cl. .................................. 376/298; 376/282; 376/283; 376/293
[58] Field of Search ............ 176/37, 38; 376/282, 283, 293, 298

[56] References Cited

U.S. PATENT DOCUMENTS

| 3,115,450 | 12/1963 | Schanz | 176/37 |
|---|---|---|---|
| 3,168,445 | 2/1965 | Ziegler et al. | 176/38 |
| 3,248,298 | 4/1966 | Norman | 176/38 |
| 3,556,941 | 1/1971 | Takahashi | 176/37 |
| 3,666,622 | 5/1972 | Schluderberg | 176/38 |
| 3,712,851 | 1/1973 | Isberg et al. | 176/37 |
| 3,718,539 | 2/1973 | West et al. | 176/38 |
| 4,056,436 | 11/1977 | Bukrinsky et al. | 176/38 |
| 4,213,824 | 7/1980 | Jabsen | 176/38 |
| 4,243,485 | 1/1981 | Chabin | 176/37 |

FOREIGN PATENT DOCUMENTS

| 2252574 | 5/1973 | Fed. Rep. of Germany | 176/37 |
|---|---|---|---|
| 302168 | 7/1968 | Sweden | 176/37 |

Primary Examiner—Sal Cangialosi

[57] ABSTRACT

The system according to the invention comprises a first room which accommodates a reactor plant and an active-type sprinkler means to condense steam released by the ebullient coolant after an accident. A loss of coolant may occur at any point of the reactor plant; that notwithstanding, the rising pressure in said first room drives the air out of that room through holes provided in the walls of the room in immediate proximity to the floor and spaced at a maximum distance from one another over the perimeter of the walls. The air is forced into an intermediate chamber wherefrom it is directed to a second room through channels and a basin-type condenser arranged in a second room. The length of the channels is selected so as to form a water seal to prevent the backflow of air driven from the first room to the second room and thus produce rarefaction in the first room.

18 Claims, 14 Drawing Figures

SYSTEM FOR MITIGATING CONSEQUENCES OF LOSS OF COOLANT ACCIDENT AT NUCLEAR POWER STATION

FIELD OF THE INVENTION

The present invention relates to nuclear power engineering and, more particularly, to a system for mitigating the consequences of a loss of coolant accident at a nuclear power station.

The system according to the invention is aimed at preventing radioactive contamination of the environment which may be the result of an accident at a nuclear power station where the coolant is water confined within a sealed coolant circuit and maintained at a high pressure and temperature.

BACKGROUND OF THE INVENTION

The most serious accident that may occur at a nuclear power station is a loss of coolant accident which means an instantaneous rupture of a pipeline of a maximum diameter and free escape of the coolant at both ends of that pipeline. The coolant brings radioactive fission products to the reactor room. The steam released by the ebullient coolant raises the pressure in the reactor room so that there is a danger of discharge of radioactive products into the atmosphere.

One of the ways to prevent radioactive contamination of the environment is the use of hermetically containments which hold the radioactive products released as a result of an accident.

Such containments are designed for a maximum steam pressure. A loss of coolant accident normally results in a release of a large amount of steam, so a containment must be large and sturdy in order to withstand the pressure of the high-temperature steam-and-air mixture. Clearly, such an containment is quite expensive.

One of the ways to cut down the cost of a containment is to reduce the pressure under it. The problem can be solved by using a cooling medium for steam condensation or by dividing the inner space of the containment into two compartments and arranging a condenser means between these compartments (cf. U.S. Pat. No. 3,379,613, Cl. 176/37).

The reactor plant and coolant circuit equipment are arranged in the first compartment; the second compartment is intended to receive air driven from the first compartment by high pressure due to the release of steam after a loss of coolant accident. Passive-type condensers are disposed between the first and second compartments (cf. also U.S. Pat. No. 3,253,996, Cl. 176/38).

Following an accident, the ebullient coolant produces steam that mixes with the air filling the first compartment; as a result, the pressure in the first compartment becomes higher than that in the second compartment. The pressure difference forces the steam-and-air mixture into the condenser which condenses the steam; the air is driven into the second compartment, and the pressure in that compartment goes up. The passive-type condenser is an ice condenser or a pool of water through which the steam-and-air mixture is bubbled. Despite the use of pressure reduction means, excess pressure within the containment persists over a long period of time. No containment can be 100% hermetic, so it is practically impossible to avoid radioactive contamination of the environment. A containment must be extremely tight to keep the contamination within permissible limits; this again means that such a containment must be quite expensive.

There is known a system for mitigating the consequences of a loss of coolant accident at a nuclear power station, which comprises two rooms whereof the first accommodates a reactor plant and coolant circuit and communicates through a valve with the second room where pressure is permanently kept below one atmosphere by sucking air out of that second room (cf. U.S. Pat. No. 3,375,162, Cl. 176/37).

Following a loss of coolant accident, the steam-and-air mixture is driven into the second room which accommodates a condenser of steam. The influx of the steam-and-air mixture raises the pressure in the second room. A sufficiently high degree of rarefaction in the second room is bound to bring about rarefaction in the first room. It must be pointed out, however, that the system under review is highly expensive because it necessitates the construction of said second chamber where a subatmospheric pressure has to be maintained all the time.

There is further known a system for mitigating the consequences of a loss of coolant accident at a nuclear power station. This system comprises a first room which accommodates a reactor plant and communicates with a second room intended to receive the air forced thereto from the first room where the pressure is increased after an accident and loss of coolant (cf. U.S. Pat. No. 4,056,436, Cl. 176/37).

Arranged between the first and second rooms is a passive-type condenser of steam released due to ebullition of the leaking coolant. The first room communicates with the second room through a channel having a check valve installed at the inlet of the second room and intended to prevent the backflow of air ousted from the first room. The condenser is a bubbler comprising at least one trough filled with a cooling liquid and covered by a jacket. The walls of the trough and jacket form channels for the steam-and-air mixture. The outlet of the jacket communicates with the check valve. In order to produce rarefaction in the first room after an accident, use is made of an active-type sprinkler means which is turned on when all the coolant is out and power supply is resumed, and is turned off when all the steam is condensed. The reliability of the system under review depends, in fact, on the reliability of the check valve installed at the inlet of the second room. The check valve is an active-type device in the sense that it comprises movable parts. The check valve may fail to operate if any of these parts is damaged or if a foreign object gets into the valve. As a result, the air from the second room flows back to the first room to raise pressure in the first room above the atmospheric one. High pressure in the first room may persist over a prolonged period of time so that there may be a leakage of radioactive products into the atmosphere through cracks that may develop in the walls of the first room.

There is still further known a system for mitigating the consequences of a loss of coolant accident at a nuclear power station. The system comprises a first room which accommodates a reactor plant and an active-type sprinkler means to condense steam produced by the ebullient coolant after an accident. As the steam rises pressure in said first room, air is driven from this room through holes provided in the walls of the room to an intermediate chamber and through channels t a basin-type condenser of steam, which is arranged in a second room (cf. U.S. Pat. No. 3,668,069, Cl. 176/38).

The holes in the walls of the first room are found at the upper part of the walls and spaced equidistantly. A loss of coolant accident may occur at any point of the reactor plant, and the steam released as a result of the accident reaches the intermediate chamber through the holes that are nearest to the coolant leakage point, so the rate at which the air is driven from the first room to the second is kept at a minimum. As the sprinkler means is brought into play, the pressure in the first room becomes lower than that in the second room; the water is driven out of the channels and the air from the second room is forced back to the first room. The system is such that a pressure above one atmosphere is maintained therein over a prolonged period of time following an accident, and radioactive products are released into the atmosphere through cracks in the containment.

SUMMARY OF THE INVENTION

It is the primary object of the present invention to provide a system for mitigating the consequences of a loss of coolant accident at a nuclear power station, which would prevent a discharge of radioactive products into the atmopshere by producing rarefaction in the first room which accommodates the reactor plant, and maintaining that rarefaction over a prolonged period of time.

It is another object of the invention to produce rarefaction in the first room in the hastest possible way by intensively forcing the air from the first room to the second and condensing the steam produced as a result of the accident before power supply is resumed and before the active-type sprinkler means is brought into action.

The foregoing and other objects of the invention are attained by providing a system for mitigating the consequences of a loss of coolant accident at a nuclear power station, comprising a first room which accommodates a reactor plant and an active-type sprinkler means to condense steam released due to ebullition of the leaking coolant after an accident, in which first room pressure is mounted following an accident so that the air contained therein is driven out through holes in its walls to an intermediate chamber and through channels to a basin-type condenser intended to condense the stream produced as a result of the accident and arranged in a second room, the system being characterized, in accordance with the invention, in that the holes in the walls of the first room are in immediate proximity to the floor of said first room and spaced at a maximum distance from one another over the walls, whereby a maximum amount of air is driven through these holes from said first room and through the basin-type condenser to said second room irrespective of the point at which loss of coolant may occur, the length of said channels being selected so as to form a water seal to prevent the backflow of air from said second room to the first and thus produce rarefaction in said first room.

It is expedient that the system should be provided with a passive-type sprinkler means arranged above the first room, communicating with the first room and actuated right after an accident so as to condense steam released by the ebullient coolant before power supply is resumed and before the active-type sprinkler means is brought into action, and thus ensure fast rarefaction in the first room.

The passive-type sprinkler means may be of the type that comprises a vessel partially filled with water, a main pipeline connected with its first end to the vessel so that a water seal is formed in the main pipeline, and a water sprinkler device connected to the second end of the main pipeline and intended to sprinkle water in the first room.

It is expedient that the passive-type sprinkler means should be provided with a means to speed up the actuation of the sprinkler means in case of an accident.

This means may be of the type that comprises at least one pipeline with a choke, through which the vessel communicates with the first room so that a water seal is formed in the pipeline.

It is advisable that one end of the pipeline should be immersed in water in the vessel and include an elbow rising above the level of water in the vessel for forming a water seal.

It is highly desirable that one end of the pipeline should be above the level of water in the vessel, and that a sleeve member should be arranged above this end of the pipeline with walls of the sleeve member being partially immersed in the water to form a water seal.

It is expedient that a water sprinkling means should be installed at that end of the pipeline which is found in the first room so as to sprinkle water in the first room.

The means to speed up the actuation of the passive-type sprinkler means may be a heat exchanger arranged in the first room and communicating by means of pipelines with that part of the vessel which is filled with water.

It is desirable that the means to speed up the actuation of the passive-type sprinkler means should include a pipeline to communicate the first room with that part of the vessel which is filled with air, and a choke installed in the main pipeline.

The means to speed up the actuation of the passive-type sprinkler means may also include a tank arranged below the vessel partially filled with water and formed by an expanded portion of the main pipeline.

It is expedient that the means to speed up the actuation of the passive-type sprinkler means should be provided with a water ejector communicating by means of a pipeline with the air-filled space of the main pipeline's elbow or sleeve member, or with the air-filled space of the tank.

It is desirable that a pipeline should communicate the tank with the intermediate chamber, and that one end of this pipeline should be arranged inside the tank and at some distance from the tank's bottom.

The means to speed up the actuation of the passive-type sprinkler means may be provided with a gas ejector installed between the first room and intermediate chamber and having the tank's pipeline communicating with its suction chamber.

The system according to the invention produces rapid rarefaction in the first room following a loss of coolant accident and fully prevents contamination of the environment with radioactive products released in the first room.

BRIEF DESCRIPTION OF THE ATTACHED DRAWINGS

Other objects and advantages of the present invention will become more apparent from the following detailed description of preferred embodiments thereof, taken in conjunction with the accompanying drawings, wherein.

DETAILED DESCRIPTION OF THE INVENTION

Referring to the accompanying drawings, the system for mitigating the consequences of a loss of coolant accident at a nuclear power station comprises a first room 1 (FIG. 1) and a second room 2.

Figure 1:
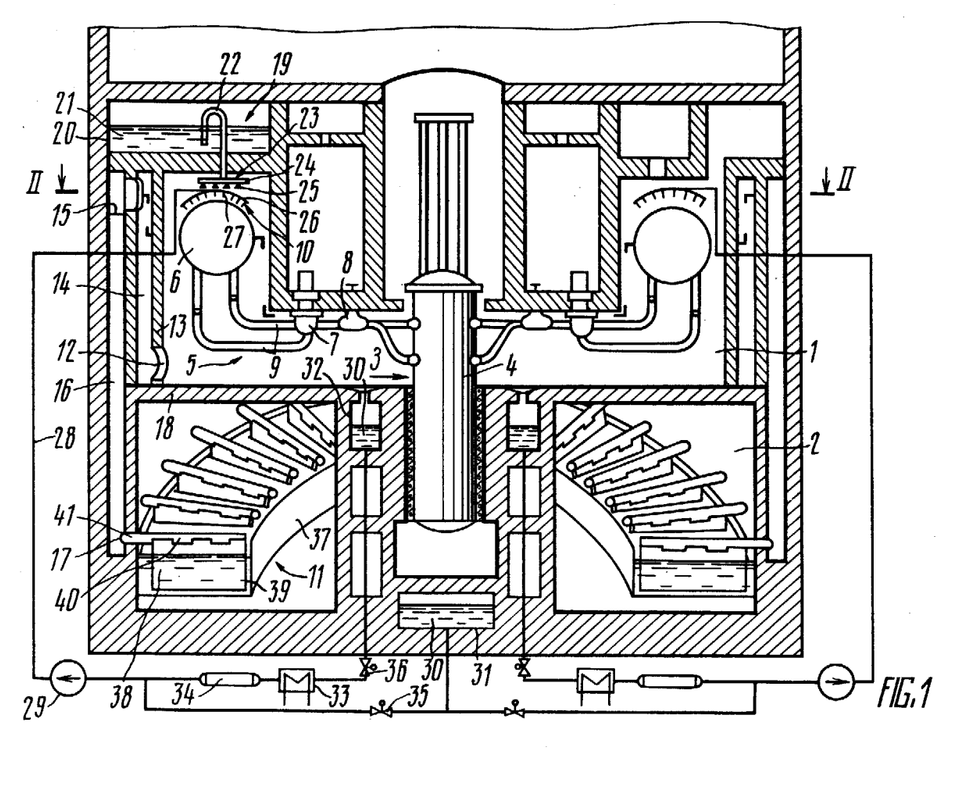
FIG. 1 is an elevation view of a system for mitigating the consequences of a loss of coolant accident at a nuclear power station, in accordance with the invention.

In the embodiment shown in FIG. 1 the second room 2 is arranged below the first room 1. However, another mutual arrangement of the first and second rooms is possible.

The first room 1 is confined within a hermetically sealed envelope conventionally represented by the thick line, and accommodates a reactor plant 3 which comprises a reactor 4 and a coolant circuit 5 including, in turn, steam generators 6, pumps 7 and gate valves 8 which are connected to the reactor 4 by means of a pipeline 9. The present specification only lists that equipment of the reactor plant 3 which is shown in the drawings. It must be borne in mind, however, that the list is much longer and includes, for example, ventilation equipment which is not shown in the drawings because it is irrelevant to the present invention.

The first room 1 also accommodates an active-type sprinkler means 10 to condense steam produced by the boiling coolant following an accident.

The second room 2 is confined within a sealed envelope which is also conventionally shown by the thick line; the second room 2 accommodates a basin-type condenser 11 intended to condense steam released as a result of an accident. A release of steam in the room 1 raises pressure in the room 1 so that air contained therein is driven out through holes 12 provided in walls 13 of the room 1 to an intermediate chamber 14 and then through inlets 15 of channels 16 and their outlets 17 and the basin-type condenser 11 to the second room 2.

Figure 2:
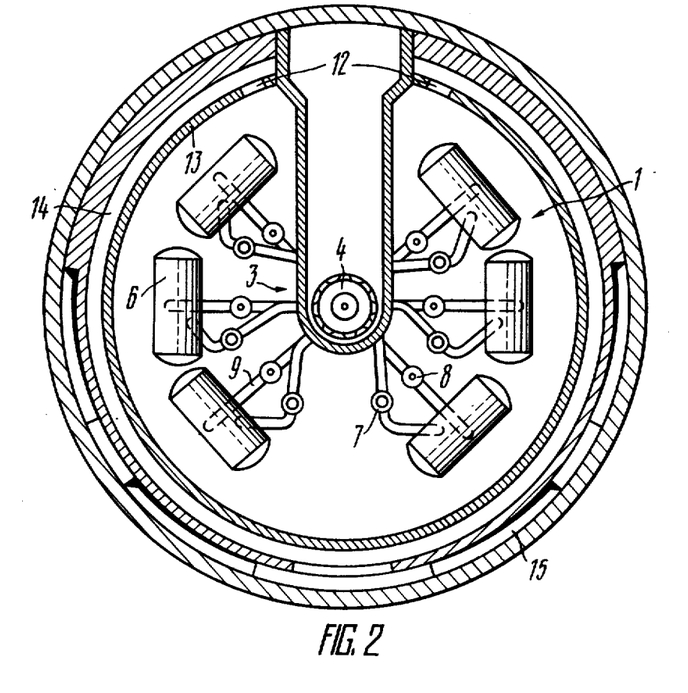
FIG. 2 is a section taken on line II—II of FIG. 1 (for reasons of simplicity, FIG. 1 shows a hole in the wall of the first room matched with the plane of the section taken on line II—II)

The holes 12 in the walls 13 of the first room 1 are found on the boundary between the walls 13 and a floor 18 of the first room 1, i.e. in immediate proximity to the floor 18. As shown in FIG. 2, the holes 12 are spaced at a maximum distance from one another, wherefore a maximum amount of air is forced from the first room 1 through the holes 12 (FIG. 1) and the basin-type condenser 11 to the second room 2, regardless at which point of the reactor plant 3 a leakage of coolant may occur.

The length of the channels 16 is selected so as to form a water seal to prevent the backflow of air from the second room 2 to the first room 1 and thus produce rarefaction in the room 1. The height in meters of the channels 16 should be not less than the ten-fold ratio of the combined volumes of the first room 1 and intermediate chamber 14 to the volume of the second room 2.

According to the invention, the system is provided with a passive-type sprinkler means 19 arranged above the first room 1 and communicating therewith. The passive-type sprinkler means 19 is actuated right after an accident, before the active-type, sprinkler means 10 is brought into action; this speeds up the condensation of steam released as a result of the accident and cuts down the time required to produce rarefaction in the first room 1.

The passive-type sprinkler means 19 comprises a vessel 20 partially filled with water 21, and a pipeline 22 whereof one end communicates with the water-filled part of the vessel 20 so that a water seal is formed in the pipeline 22. For this purpose, the pipeline 22 is bent to form an elbow which rises above the level of the water 21. The means 19 further includes a water sprinkling device 23 connected to the second end of the pipeline 22 and intended to sprinkle water in the first room 1. In the embodiment under review, these functions are performed by a pipe 24 carrying water sprinklers 25. Of course, the sprinkler may be of any other type, such as a trough with a perforated wall.

As stated above, the first room 1 accommodates the active-type sprinkler means 10, while the second room 2 accommodates the basin-type condenser 11. The active-type sprinkler means 10 comprises a pipe 26 carrying sprinklers 27 and connected by a pipeline 28 to a pump 29 which supplies water 30 to the sprinklers 27 from a tank 31 or a sump 32 provided in the floor 18 of the first room 1; the water 30 is passed through a heat exchanger 33 and an ion-exchange filter 34. From the tank 31 or sump 32, the water 30 is fed through valves 35 and 36, respectively. The basin-type condenser 11 comprises a tank 37 filled with water 38 wherein there are immersed outlets 30 of pipelines 40 whose inlets 41 are connected to the outlets 17 of the channels 16.

Such is one of the embodiments of the system for mitigating the consequences of a loss of coolant accident at a nuclear power station, in accordance with the invention. The system makes it possible to bring down the pressure in the hermetically sealed envelope and produce rarefaction in the room accommodating the reactor plant, where most of the radioactive products are released as a result of an accident.

Other alternative embodiments of the system according to the invention are dealt with below; these make it possible to accelerate the condensation of steam in the room accommodating the reactor plant so that condensation starts before the active-type sprinkler means is put into action, whereby rarefaction can be rapidly produced in the reactor plant room.

With this aim in view, the passive-type sprinkler means 19 (FIG. 3) is provided with a means 42 intended to speed up the actuation of the means 19 in case of an accident.

Figure 3:
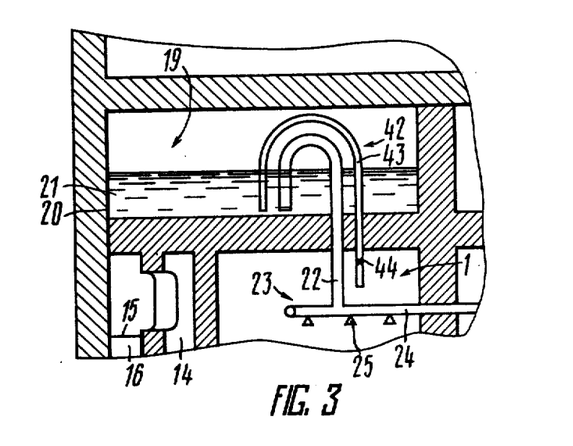
FIG. 3 is an elevation view of the passive-type sprinkler means, a part of the first room and a part of the intermediate chamber of the system in accordance with the invention.

The means 42 comprises a pipeline 43 with a choke 44. The pipeline 43 serves to connect the vessel 20 to the first room 1 so that a water seal is formed in this pipeline 43. For this purpose, one end of the pipeline 43 is immersed in the water 21 in the vessel 20 and bent to form an elbow which rises above the level of the water 21. According to the embodiment under review, the means 42, intended to rapidly bring the passive-type sprinkler means 19 into action, comprising a single pipeline 43 with the choke 44. The means 42 may comprise a plurality of pipelines with their respective chokes, which increases the outflow of water from the vessel, accelerates the condensation of steam and thus cuts down the time it makes to bring the passive-type sprinkler means into action.

Figure 4:
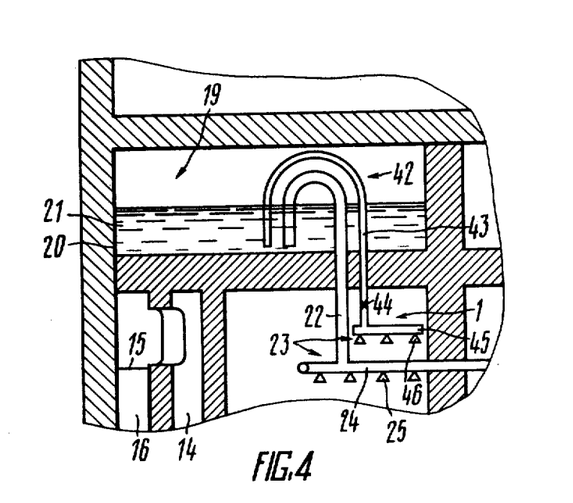
FIG. 4 is an elevation view of a passive-type sprinkler means similar to that of FIG. 3, but featuring two water sprinklers.

According to FIG. 4, the end of the pipeline 43, which is found in the first room 1, carries the sprinkling device 23 to sprinkle the water 21 in the room 1. The sprinkling device 23 is a pipe 45 with water sprinklers 46 mounted thereon. An increase in the area of contact between water and the steam-and-air mixture in the room 1 accounts for a faster condensation of steam and, consequently, a faster operation of the sprinkler means 19.

Figure 5:
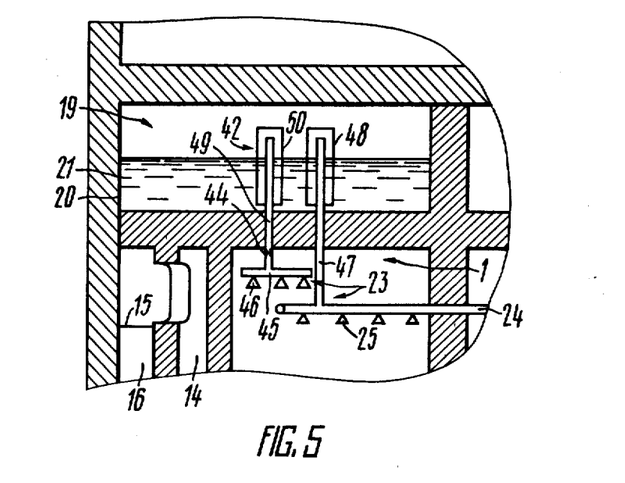
FIG. 5 is an elevation view of an alternative embodiment of the sprinkler means, which also shows a part of the first room and a part of the intermediate chamber of the system in accordance with the invention.

FIG. 5 presents another embodiment of the passive-type sprinkler means 19.

According to FIG. 5, one end of a pipeline 47, through which the vessel 20 communicates with the first room 1, is above the level of the water 21. Arranged above this end of the pipeline 47 is a sleeve member 48 whose walls are partially immersed in the water 21 to form a water seal. One end of a pipeline 49 with the choke 44, through which the vessel 20 communicates with the first room 1, is also above the level of the water 21; a sleeve member 50 is arranged over this end of the pipeline 49. The walls of the sleeve member 50 are also partially immersed in the water 21 to form a water seal.

Figure 6:
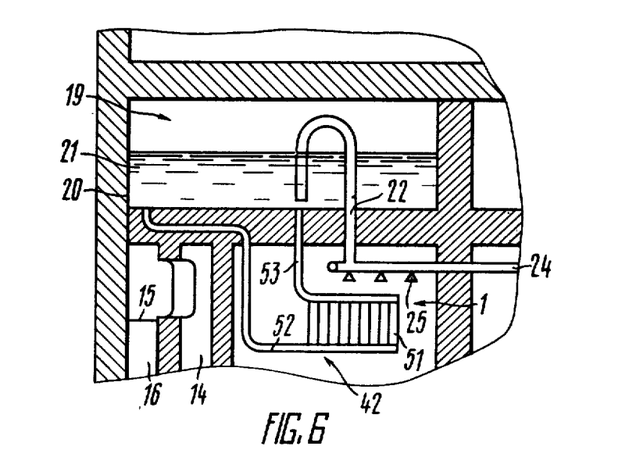
FIG. 6 is an elevation view of the passive-type sprinkler means of FIG. 3 with a different means to speed up the actuation of the passive-type sprinkler means.

According to FIG. 6, the means 42 to speed up the actuation of the passive-type sprinkler means 19 of FIG. 3 comprises a heat exchanger 51 arranged in the first room 1 and communicating with the water-filled part of the vessel 20 by means of pipelines 52 and 53.

Figure 7:
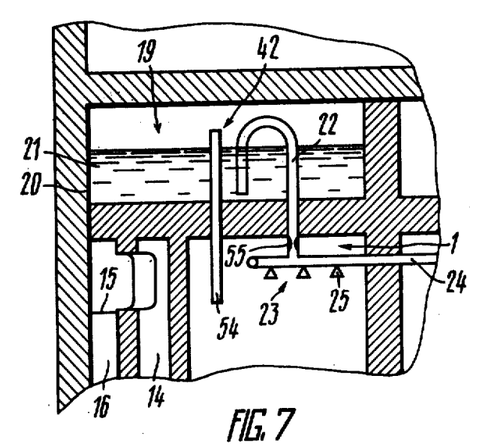
FIG. 7 is an elevation view of the passive-type sprinkler means of FIG. 3, featuring yet another version of the means to speed up the actuation of the passive-type sprinkler means.

According to FIG. 7, the means 42 to speed up the actuation of the passive-type sprinkler means 19 of FIG. 3 comprises a pipeline 54 (FIG. 7) whereby the air-filled part of the vessel 20 communicates with the first room 1, and a choke 55 installed in the pipeline 22.

According to FIG. 8, the means 42 to speed up the actuation of the passive-type sprinkler means 19 of FIG. 7 additionally includes a tank 56 (FIG. 8) arranged below the vessel 20 and formed by an expanded portion of the pipeline 22.

Figure 9:
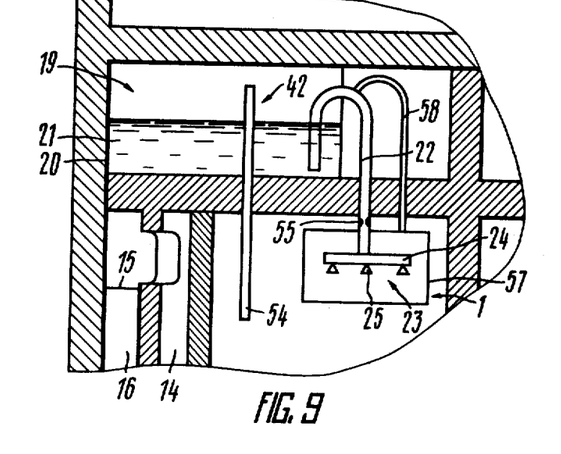
FIG. 9 is an elevation view of the sprinkler means of FIG. 7, featuring a water ejector.

According to FIG. 9, the means 42 to speed up the actuation of the passive-type sprinkler means 19 of FIG. 7 is provided with a water ejector 57 (FIG. 9) communicating through a pipeline 58 with the air-filled space within the elbow of the pipeline 22. The ejector 57 accelerates the filling of the pipeline 22 with water and thus considerably improves the effectiveness of the passive-type sprinkler means 19.

Figure 10:
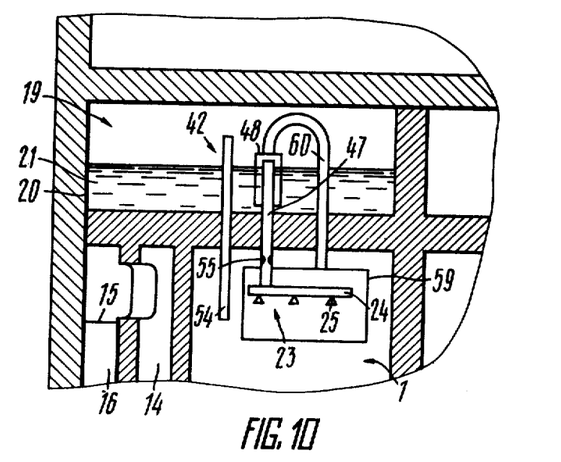
FIG. 10 is an elevation view of another version of the passive-type sprinkler means of the system in accordance with the invention.

The passive-type sprinkler means 19 of FIG. 10 is such that the water seal in the pipeline 47 is formed as shown in FIG. 5, whereas the means to speed up the actuation of the sprinkler means 19 is like that of FIG. 9. The embodiment of FIG. 10 differs from the already discussed versions in that a water ejector 59 communicates through a pipeline 60 with the sleeve member 48 of the pipeline 47.

Figure 8:
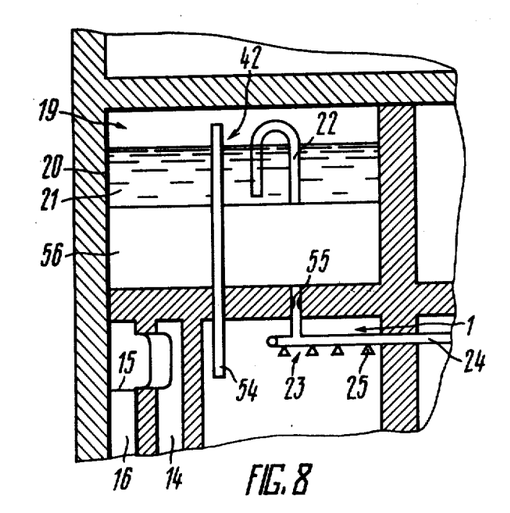
FIG. 8 is an elevation view of an alternative embodiment of the sprinkler means, similar to that of FIG. 7.
Figure 11:
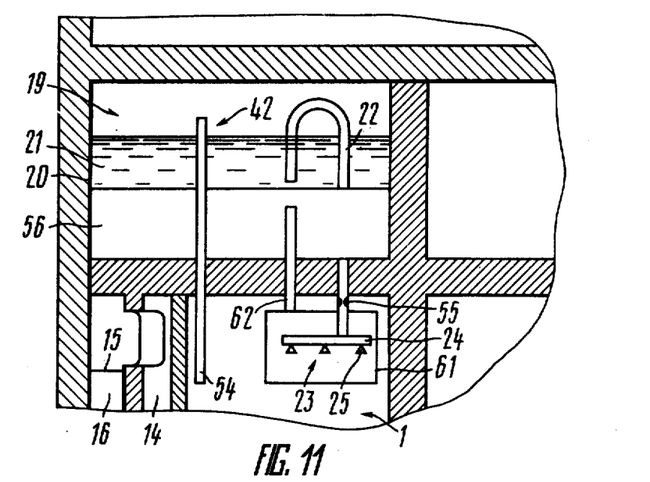
FIG. 11 is an elevation view of an alternative embodiment of the sprinkler means, similar to that of FIG. 8.
Figure 12:
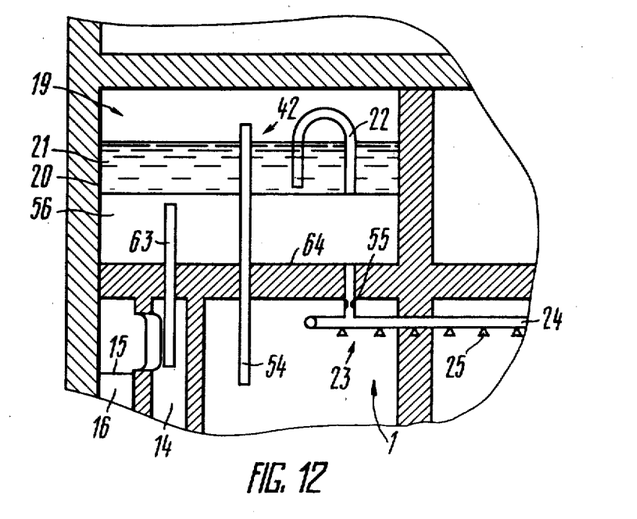
FIG. 12 is an elevation view of another alternative embodiment of the sprinkler means, similar to that of FIG. 8.
Figure 13:
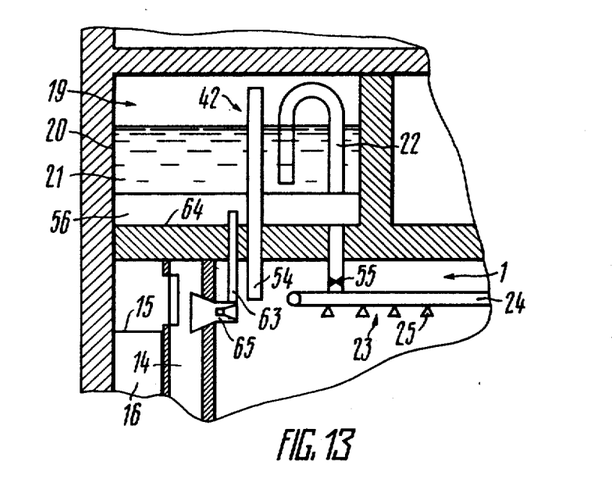
FIG. 13 is an elevation view of yet another alternative embodiment of the sprinkler means, similar to that of FIG. 8.

The sprinkler means 19 of FIGS. 11, 12 and 13 is similar to that of FIG. 8.

The embodiment of FIG. 11 is characterized by that the means 42 to speed up the actuation of the passive-type sprinkler means 19 is provided with a water ejector 61 which communicates through a pipeline 62 with the air-filled space within the tank 56.

The embodiment of FIG. 12 is characterized in that the tank 56 is connected by a pipeline 63 to the intermediate chamber 14. One end of the pipeline 63 is inside the tank 56, at some distance from a bottom 64 of the tank 56.

The embodiment of FIG. 13 is characterized in that the means 42 to speed up the actuation of the passive-type sprinkler means 19 is provided with a gas ejector 65 disposed between the first room 1 and intermediate chamber 14. The suction chamber of the gas ejector 65 communicates with the pipeline 63 of the tank 56.

The operating principle of the system for mitigating the consequences of a loss of coolant accident at a nuclear power station in accordance with the present invention is as follows.

In case of a rupture of the pipeline 9 (FIG. 1) of the reactor plant 3, the coolant escapes into the first room 1 to boil and release steam which fills the room 1. There is a rise of the pressure in the room 1, as shown by curve 66 of the graph of FIG. 14, where time $\tau$ is plotted as abscissas and pressure P is plotted as ordinates. From the room 1 (FIG. 1), the steam-and-air mixture is forced through the holes 12 (FIGS. 1 and 2) in the walls 13 and through the intermediate chamber 14 and channels 16 (FIG. 1) to the basin-type condenser 11. The latter condenses the steam, whereas air bubbles through the water into the second room 2. Simultaneously, the steam-and-air mixture is driven from the first room 1 through the pipeline 22 to the water-filled space inside the vessel 20 of the passive-type sprinkler means 19. The steam condenses, but the air accumulates in the air-filled space inside the vessel 20, raising the pressure therein. The pressure in the air-filled space of the vessel 20 increases in proportion to the increase of pressure in the room 1, the former being less than the latter by a value corresponding to the thickness of the layer of water above the end of the pipeline 22 immersed in the water. The duct, through which the steam-and-air mixture is forced from the first room 1 to the condenser 11, has a certain hydraulic resistance; it must also be remembered that the release of steam from the coolant is at its maximum at the onset of the accident. These factors make it clear that the pressure in the room 1 reaches a maximum several seconds after the onset of the accident, as shown by curve 66 of FIG. 14, the decreases as the ingress of steam to the room 1 becomes less intensive than the ourflow of the steam-and-air mixture from the room 1 to the condenser 11. The decrease of the pressure in the room 1 is intensified by the condensation of steam on cool surfaces inside the room 1. As the pressure in the room 1 is reduced to a value at which the difference of pressures in the air-filled space of the vessel 20 (curve 67 of FIG. 14) and room 1 is greater than the height of the column of liquid in the water seal of the pipeline 22 (point "a" on curve 67 of FIG. 14), the water 21 is forced from the vessel 20 into the sprinkling device 23 and is sprinkled in the first room 1. The steam condensation in the room 1 is intensified until a rarefaction is produced, keeping in mind that much of the air initially filling the room 1 has been driven with the steam-and-air mixture to the condenser 11 and room 2.

Figure 14:
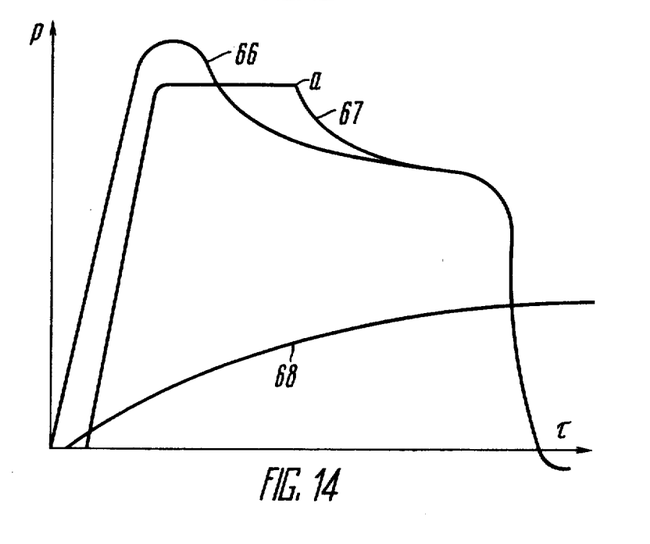
FIG. 14 is a graph showing the change of pressure after an accident in the first room, second room and air-filled space of the passive-type sprinkler means of the system in accordance with the invention.

As the pressure in the room 1 becomes lower than that in the room 2, as shown by curve 68 of FIG. 14, water is forced from the tank 37 of the condenser 11 to the channels 16 to form a water seal which prevents the backflow of air from the room 2 to the room 1 and intermediate chamber 14. Thus rarefaction in the room 1 can be maintained over a prolonged period of time. This object is also achieved by bringing the active-type sprinkler means 10 into operation, which condenses steam produced in the room 1 by the afterheat of the reactor 4.

In the embodiment of FIG. 3, the flow of water from the vessel 20 to the sprinkling device 23 is intensified and the passive-type sprinkler means 19 is rapidly actuated by reducing the pressure in the room 1 with the aid of the means 42 which starts operating as soon as the difference of pressures in the air-filled space of the vessel 20 and between the choke 44 and water seal of the pipeline 43 of the means 42 is greater than the value corresponding to the height of the column of water seal. From the vessel 20, water is driven into the pipeline 43 and sprinkled in the room 1, which helps to reduce the pressure in the room 1 and cuts down the time it takes to actuate the passive-type sprinkler means 19.

According to the embodiments of FIGS. 4 and 5, the sprinkling of water supplied from the vessel 20 to the room 1 is made more effective by using the water sprinklers 46.

According to the embodiment of FIG. 6, the steam released in the room 1 is condensed on the surface of the heat exchanger 51, which reduces the pressure in the room 1 and the time it takes to bring the passive-type sprinkler means 19 into action.

According to the embodiment of FIG. 7, the choke 55 operates so that the pressure in the pipeline 22 rises more slowly than the pressure in the air-filled space of the vessel 20. As soon as the difference of pressures in the air-filled space of the vessel 20 and between the choke 55 and water seal of the pipeline 22 becomes higher than the value corresponding to the height of the column of water in the water seal, the pipeline 22 is filled with water to produce a siphon, and water is fed to the sprinkling device 23 and sprinkled in the room 1.

According to the embodiment of FIG. 8, the increase of pressure in the pipeline 22 is slowed down by the tank 56 formed by an expanded portion of the pipeline 22. This is another way to rapidly bring the sprinkler means 19 into action.

The embodiments of FIGS. 9 and 10 operate as follows. As water is forced from the vessel 20 to the sprinkling device 23, the water ejector 57 is brought into play to suck the air from above the water seal in the pipeline 22, which improves the functioning of the siphon. The same effect is attained in the embodiment of FIG. 11, where the ejector 61 sucks air from the tank 56.

The sprinkler means of FIG. 12 operates as follows. As soon as the steam-and-air mixture is forced through the holes 12 (FIG. 1) out of the room 1, a pressure difference is produced between the room 1 (FIG. 12) and intermediate chamber 14. A pressure difference is also produced between the air-filled space of the vessel 20 and the intermediate chamber 14. As a result, water is forced from the vessel 20 into the tank 56 and to the sprinkling device 23 which sprinkles is in the room 1.

According to the embodiment of FIG. 13, part of the steam-and-air mixture is forced from the room 1 to the intermediate chamber 14 through the gas ejector 65 which also sucks air from the tank 56 and thus facilitates the filling of the tank 56 with water coming from the vessel 20.

The system for mitigating the consequences of a loss of coolant accident at a nuclear power station according to the present invention operates so that it takes only 3 to 5 minutes to produce rarefaction in the reactor plant room which is the most dangerous place from the viewpoint of radioactive contamination. It is significant that rarefaction is produced without resorting to such active-type means as check valves, which accounts for a high reliability of the system and makes it an effective tool to prevent radioactive contamination of the environment.

Although the text of this specification includes a limited number of specific technical terms, it is to be understood that each of these terms covers the entire range of words denoting similar objects and elements which serve similar purposes.

While particular embodiments of the present invention have been shown and described, various modifications thereof will be apparent to those skilled in the art and therefore it is not intended that the invention should be limited to the disclosed embodiments or to the details thereof; it is to be understood that numerous departures may be made therefrom within the spirit and scope of the invention as defined in the claims.

What is claimed is:

1. A system for mitigating the consequences of a loss of coolant accident at a nuclear power station, comprising:

a first room confined within a hermetically sealed envelope and having walls and a floor;

a second room confined within a hermetically sealed envelope having walls and a floor;

said first room accomodating therein a reactor plant liable to an accidental loss of coolant and an active-type sprinkler means intended to condense the steam released by the boiling coolant after an accident;

said second room, accomodating a basin-type condenser to condense steam;

an intermediate chamber positioned between the said first room and the said second room within the said hermetically sealed envelope;

holes provided in said walls of said first room in immediate proximity to said floor of said first room and spaced at a maximum distance from one another along the perimeter of said walls;

said intermediate chamber communicating with said first room through said holes so that most of the air contained in said first room is forced therefrom as a result of the rising pressure following an accident;

a plurality of vertical channels located within said envelope on the exterior of said intermediate chamber having inlets and outlets and communicating through their inlets with the upper edge of said intermediate chamber wherefrom air is forced through said inlets into said channels and through their outlets to said basin-type condenser, so that steam released as a result of an accident is condensed and air forced through said outlets of said channels is discharged into said second room;

the length of said channels being selected so as to form a water lock to prevent the backflow of air from the second room to the first and thus produce rarefaction in said first room.

2. A system as claimed in claim 1, provided with a passive-type sprinkler means arranged above said first room, communicating with said first room and actuated right after an accident so as to condense steam released due to ebullition of the coolant and rapidly produce rarefaction in said first room.

3. A system as claimed in claim 2, wherein said passive-type sprinkler means includes a vessel partially filled with water; a first pipeline having a first end and a second end and communicating through said first end with said vessel so that a water lock is formed in said first pipeline; a water sprinkling device connected to the second end of said first pipeline and intended to sprinkle water in said first room.

4. A system as claimed in claim 3, wherein said passive-type sprinkler means incorporates a means to speed up the actuation of said sprinkler means in case of an accident.

5. A system as claimed in claim 3, wherein the first end of the first pipeline is immersed in said water in said vessel and the pipeline has an elbow rising above the level of said water to form said water lock.

6. A system as claimed in claim 3, wherein the first end of said first pipeline is above the water level, and wherein provision is made for a sleeve member having walls and arranged over said first end of said first pipeline so that said walls are partially immersed in the water to form said water lock.

7. A system as claimed in claim 4, wherein said means to speed up the actuation of said passive-type sprinkler means includes at least one more pipeline having a first end and a second end and communicating said vessel with said first room so that a water lock is formed in said second pipeline, and a choke installed in said second pipeline.

8. A system as claimed in claim 4, wherein said means to speed up the actuation of said passive-type sprinkler means is a heat exchanger arranged in said first room and communicating with the water-filled space of said vessel by means of pipelines.

9. A system as claimed in claim 4, wherein said means to speed up the actuation of said passive-type sprinkler means includes a second pipeline communicating the air-filled space of said vessel with said first room, and a choke installed in said first pipeline.

10. A system as claimed in claim 7, wherein the first end of said second pipeline is immersed in said water in said vessel and the pipeline has an elbow rising above the water level to form said water lock.

11. A system as claimed in claim 7, wherein the first end of said second pipeline is above the water level, and wherein provision is made for a sleeve member having walls and arranged over the first end of said second pipeline so that said walls are partially immersed in said water to form said water lock.

12. A system as claimed in claim 7, wherein a water sprinkling device is mounted on the second end of said second pipeline, which extends into said first room, which water sprinkling device is intended to sprinkle water over said first room.

13. A system as claimed in claim 9, wherein said means to speed up the actuation of said passive-type sprinkler means includes a tank arranged below said vessel and formed by an expanded portion of said first pipeline.

14. A system as claimed in claim 9, wherein said first pipeline has an elbow rising above the water level so as to form said water lock, and wherein said means to speed up the actuation of said passive-type sprinkler means includes a water ejector communicating through a pipeline with the air-filled space inside said elbow.

15. A system as claimed in claim 9, wherein the first end of said first pipeline is above the water level, and wherein provision is made for a sleeve member having walls and arranged over said first end of said first pipeline so that said walls are partially immersed in the water to form said water lock, said means to speed up the actuation of said passive-type sprinkler means including a water ejector communicating through a pipeline with the air-filled space inside said elbow.

16. A system as claimed in claim 13, wherein said means to speed up the actuation of said passive-type sprinkler means includes a water ejector communicating through a pipeline with the air-filled space within said tank.

17. A system as claimed in claim 13, wherein said tank, which has a bottom, communicates with said intermediate chamber by means of a pipeline having a first end and a second end whereof one is inside said tank, at some distance from said bottom of said tank.

18. A system as claimed in claim 17, wherein said means to speed up the actuation of said passive-type sprinkler means includes a gas ejector having a suction chamber and disposed between said first room and said intermediate chamber, said pipeline of said tank being connected to said suction chamber.

* * * * *